United States Patent
Kaufmann et al.

(10) Patent No.: US 11,694,528 B2
(45) Date of Patent: Jul. 4, 2023

(54) LOW OR MEDIUM SWITCHGEAR MONITORING SYSTEM

(71) Applicant: ABB Schweiz AG, Baden (CH)

(72) Inventors: Patrik Reto Kaufmann, Baden (CH); Joerg Ostrowski, Zurich (CH); Stephan Wildermuth, Laudenbach (DE); Ralf Gitzel, Mannheim (DE); Joerg Gebhardt, Mainz (DE)

(73) Assignee: ABB Schweiz AG, Baden (CH)

( * ) Notice: Subject to any disclaimer, the term of this patent is extended or adjusted under 35 U.S.C. 154(b) by 148 days.

(21) Appl. No.: 17/187,894

(22) Filed: Mar. 1, 2021

(65) Prior Publication Data
US 2021/0272268 A1 Sep. 2, 2021

(30) Foreign Application Priority Data

Mar. 2, 2020 (EP) .................................. 20160409

(51) Int. Cl.
*G06T 7/00* (2017.01)
*G06K 9/62* (2022.01)

(52) U.S. Cl.
CPC .......... *G06T 7/0004* (2013.01); *G06K 9/6201* (2013.01); *G06T 2207/10048* (2013.01); *G06T 2207/30164* (2013.01); *G06T 2207/30232* (2013.01)

(58) Field of Classification Search
CPC ......... G06T 7/0004; G06T 2207/10048; G06T 2207/30164; G06T 2207/30232; G06K 9/6201; G08B 13/1672; G08B 13/19602; G08B 13/19613; G10L 25/51
See application file for complete search history.

(56) References Cited

U.S. PATENT DOCUMENTS

| 6,028,626 A | 2/2000 | Aviv |
| 2003/0025599 A1 | 2/2003 | Monroe |

(Continued)

FOREIGN PATENT DOCUMENTS

| CN | 103245862 A | 8/2013 |
| CN | 203984091 U | 12/2014 |
| CN | 104297601 A | 1/2015 |

(Continued)

OTHER PUBLICATIONS

Machine translation for CN 209266918, IDS (Year: 2019).*

(Continued)

*Primary Examiner* — Qian Yang
(74) *Attorney, Agent, or Firm* — Leydig, Voit & Mayer, Ltd.

(57) ABSTRACT

A low or medium voltage switchgear monitoring system includes: at least one sensor; a processing unit; and an output unit. The at least one sensor acquires sensor data within a compartment of a switchgear. The sensor data includes first sensor data. The sensor data includes second sensor data. The second sensor data is acquired a set time after the first sensor data. The at least one sensor provides the first sensor data and the second sensor data to the processing unit. The processing unit determines status information for a compartment of the switchgear based on a comparison of the second sensor data to the first sensor data. The output unit outputs the status information.

14 Claims, 1 Drawing Sheet

(56) References Cited

U.S. PATENT DOCUMENTS

2004/0240542 A1 12/2004 Yeredor et al.
2017/0343608 A1 11/2017 Keser et al.

FOREIGN PATENT DOCUMENTS

| CN | 106643878 | A  | 5/2017  |
| CN | 207215977 | U  | 4/2018  |
| CN | 109324270 | A  | 2/2019  |
| CN | 209266918 | U  | 8/2019  |
| CN | 110109428 | B  | 9/2020  |
| DE | 10201900241 | A1 | 12/2020 |
| TW | M364367 | U  | 9/2009  |
| WO | WO 2008046662 | A1 | 4/2008  |

OTHER PUBLICATIONS

The Patent Office of the People's Republic of China, Office Action in Chinese Patent Application No. 202110225795.6, 13 pp. (dated Apr. 18, 2022).

China National Intellectual Property Administration, Office Action in Chinese Patent Application No. 202110225795.6, 12 pp. (dated dated Dec. 7, 2022).

European Patent Office, Intention to Grant in European Patent Application No. 20160409.7, 22 pp. (dated Apr. 26, 2023).

\* cited by examiner

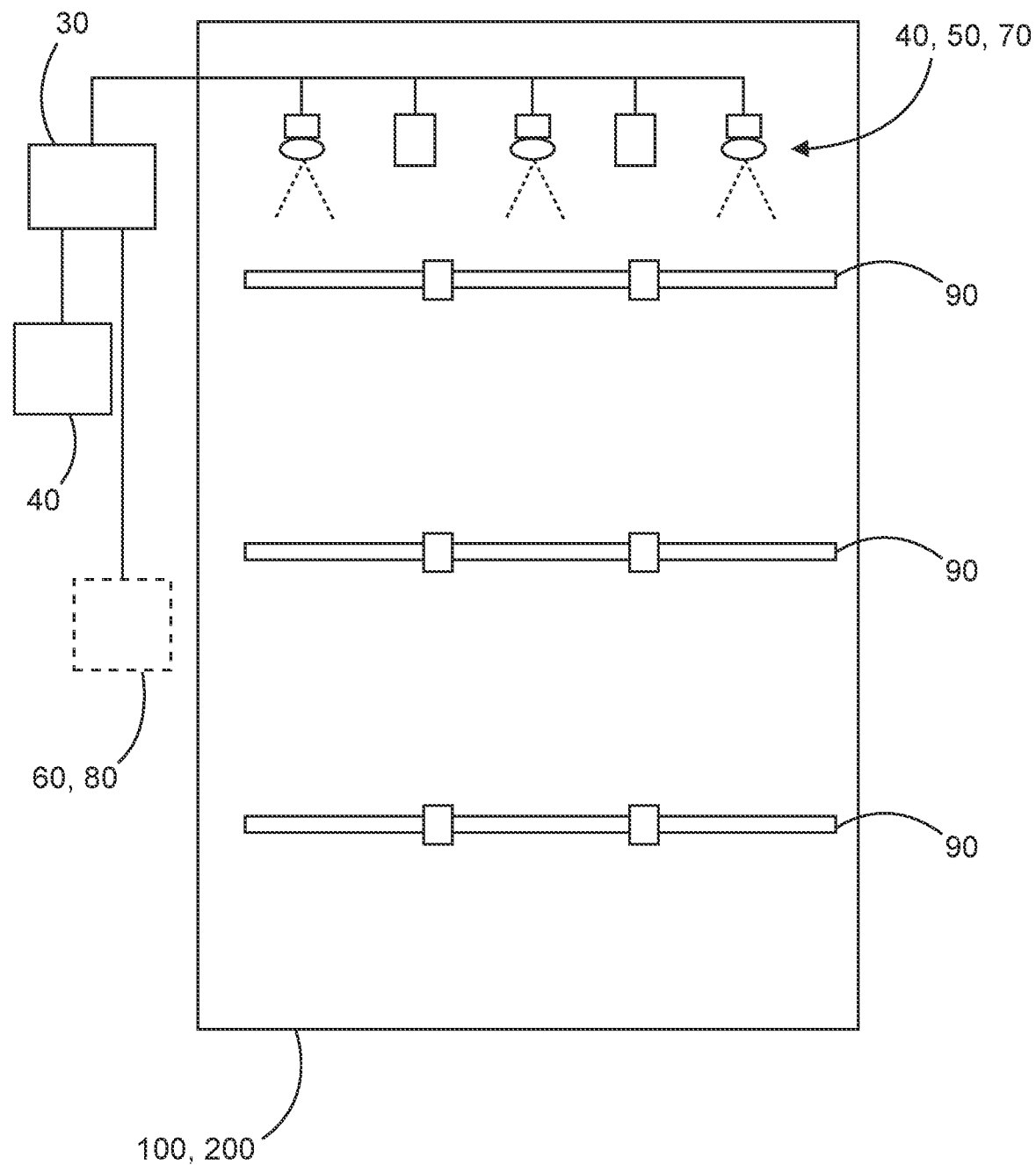

LOW OR MEDIUM SWITCHGEAR MONITORING SYSTEM

CROSS-REFERENCE TO PRIOR APPLICATION

Priority is claimed to European Patent Application No. EP 20 160 409.7, filed on Mar. 2, 2020, the entire disclosure of which is hereby incorporated by reference herein.

FIELD

The present invention relates to a low or medium voltage switchgear monitoring system.

BACKGROUND

Monitoring systems for switchgear applications are tailored towards sensing the temperature changes of components having a large thermal mass such as busbars, through for example pt100 temperature probes limited to sensing temperatures at specific points. However, such monitoring systems are not suitable for determining a coherent assessment of certain potentially severe situations arising inside panel compartment of the switchgear, such as intrusion animals or unauthorised people.

There is a need to address these issues.

SUMMARY

In an embodiment, the present invention provides a low or medium voltage switchgear monitoring system, comprising: at least one sensor; a processing unit; and an output unit, wherein the at least one sensor is configured to acquire sensor data within a compartment of a switchgear, wherein the sensor data comprises first sensor data, wherein the sensor data comprises second sensor data, the second sensor data being acquired a set time after the first sensor data, wherein the at least one sensor is configured to provide the first sensor data and the second sensor data to the processing unit, wherein the processing unit is configured to determine status information for a compartment of the switchgear, the determination comprising a comparison of the second sensor data to the first sensor data, and wherein the output unit is configured to output the status information.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 shows a schematic representation of an example of a low or medium voltage switchgear monitoring system.

DETAILED DESCRIPTION

In an embodiment, the present invention provides an improved system for monitoring a switchgear.

In an aspect, there is provided a

A low or medium voltage switchgear monitoring system (10), comprising:
  at least one sensor;
  a processing unit; and
  an output unit.

The at least one sensor is configured to acquire sensor data within a compartment of a switchgear. The sensor data comprises first sensor data. The sensor data comprises second sensor data. The second sensor data was acquired a set time after the first sensor data. The at least one sensor is configured to provide the first sensor data and the second sensor data to the processing unit. The processing unit is configured to determine status information for the compartment of the switchgear, the determination comprising a comparison of the second sensor data to the first sensor data. The output unit is configured to output the status information.

In an example, the set time is 1 second, 2 seconds, 5 seconds, 10 seconds, 30 seconds, 1 minute, 2 minutes or 5 minutes.

In this manner, a very simple observation system is provided to determine if anything is wrong with the switchgear, such as an animal or person being within the compartment when they should not be, or if a part of a piece of equipment has become loose, based on a comparison of data on a timescale shorter than timescales over which changes normally occur within the switchgear such as normal temperature rises.

Thus, an automated shutdown of the switchgear can be triggered if for example it is determined that an unauthorised person has entered the switchgear.

Also, an operator can be provided with information to determine what action if necessary should be undertaken.

In an example, the comparison comprises a subtraction of the second sensor data from the first sensor data or a subtraction of the first sensor data from the second sensor data.

Thus, the determination if there is an issue or problem with the switchgear is based on a simple subtraction of sensor data to determine if anything has changed.

In an example, the at least one sensor comprises a camera. The first sensor data comprises a first image and the second sensor data comprises a second image.

In an example, the camera is an infrared image acquisition camera and/or a visible image acquisition camera.

In an example, determination of the status information comprises a determination of a size of an object in the second image based on the comparison of the second image to the first image.

In an example, determination of the status information comprises a determination of a temperature of an object in the second image based on the comparison of the second image to the first image.

In an example, determination of the status information comprises image processing of the second image based on the comparison of the second image to the first image.

In an example, the image processing comprises utilization of a database of image data.

Thus image-based analysis is provided to determine if anything has changed in the switchgear, and based on the determination the image data itself can be analysed, where now it is known where the change has occurred in the image, and the size and/or temperature (determined from an IR image) associated with the change in the imagery can be utilised to determine if the object is an animal or human. Additionally, the image data itself can be analysed, for example using a database, to further determine what the object is, for example comparing against known object shapes for different parts of the switchgear, enabling a determination to be made that a particular part of the switchgear has become loose. The image-based system can operate alone or can operate in conjunction with an acoustic based system.

In an example, the at least one sensor comprises a microphone. The first sensor data comprises a first acoustic recording and the second sensor data comprises a second acoustic recording.

In an example, determination of the status information comprises sound pattern analysis of the second acoustic recording based on the comparison of the second acoustic recording to the first acoustic recording.

In an example, the sound pattern analysis comprises utilization of a database (80) of sound data.

Thus, a noise (or sound) based comparison system can be utilised to determine if anything has changed inside the switchgear, and based on that determination further analysis can be made using for example noise pattern analysis aligned to database information to determine what has occurred, such as an animal or human having entered the switchgear. The noise based system can operate alone or in conjunction with an image-based system.

In an example, the sensor data comprises a first plurality of sensor data for a time period between a time of acquisition of the first sensor data and a time of acquisition of the second sensor data. The output unit is configured to output the first plurality of sensor data based on the status information.

In an example, the sensor data comprises a second plurality of sensor data for a time period after a time of acquisition of the second sensor data. The output unit is configured to output the second plurality of sensor data based on the status information.

In this manner a determination can be made, based on a comparison of sensor data, that something has changed within the compartment of the switchgear. Then if necessary the image or sound data of relevance between a background first data signal and a later event based image or sound data event can be processed, automatically or by an operator. A determination can then be made as to exactly what the event is, and an assessment made as to what action should be taken. For example, it ca be determined that a piece of equipment has broken and become loose, or that an animal has entered the switchgear, or that a person has entered the switchgear and tampered with part of the equipment. Also, data stream can be provided after the second image or sound event was acquired in order that for example an operator can monitor what is happening.

In an second aspect, there is provided a low or medium voltage switchgear comprising a monitoring system according to the first aspect.

The above aspects and examples will become apparent from and be elucidated with reference to the embodiments described hereinafter.

FIG. 1 relates to a low or medium voltage switchgear monitoring system 10. The monitoring system comprises at least one sensor 20, a processing unit 30, and an output unit 40. The at least one sensor is configured to acquire sensor data within a compartment 100 of a switchgear 200. The sensor data comprises first sensor data. The sensor data comprises second sensor data. The second sensor data was acquired a set time after the first sensor data. The at least one sensor is configured to provide the first sensor data and the second sensor data to the processing unit. The processing unit is configured to determine status information for the compartment of the switchgear, the determination comprising a comparison of the second sensor data to the first sensor data. The output unit is configured to output the status information.

In an example, the observation system is configured to periodically acquired a series of first sensor data at subsequently time periods, with a series of second sensor data acquired at set times, such that each second sensor data is acquired between the first sensor data. Thus, the first sensor data constitute a background or reference data signal against which a subsequent data signal is compared. By gradually updating the background data signal slowly changing events in the switchgear, such as a gradual heating up of components such as busbars 90, does not lead to a triggering that there is an adverse event.

In an example, the status information indicates that there is a change event in the compartment of the switchgear based on a change between the first sensor data and the second sensor data. In an example, the change event is registered based on the change between the first sensor data and the second sensor data being greater than a threshold. Thus, noise or slowly changing temperatures will not lead to triggering that something has changed in the switchgear.

According to an example, the set time is 1 second, 2 seconds, 5 seconds, 10 seconds, 30 seconds, 1 minute, 2 minutes or 5 minutes. The set time can be between these times, and can be longer than 5 minutes, but is shorter than a time frame over which normal temperature changes occur in the switchgear.

In an example, the output unit is configured to output the second sensor data.

In an example, the output unit is configured to output the comparison of the second sensor data to the first sensor data.

According to an example, the comparison comprises a subtraction of the second sensor data from the first sensor data or a subtraction of the first sensor data from the second sensor data.

According to an example, the at least one sensor comprises a camera 50. The first sensor data can then comprise a first image and the second sensor data can comprise a second image.

According to an example, the camera is an infrared image acquisition camera and/or a visible image acquisition camera.

According to an example, determination of the status information comprises a determination of a size of an object in the second image based on the comparison of the second image to the first image.

According to an example, determination of the status information comprises a determination of a temperature of an object in the second image based on the comparison of the second image to the first image.

According to an example, determination of the status information comprises image processing of the second image based on the comparison of the second image to the first image.

According to an example, the image processing comprises utilization of a database 60 of image data.

According to an example, the at least one sensor comprises a microphone 70. The first sensor data can then comprise a first acoustic recording and the second sensor data can comprise a second acoustic recording.

According to an example, determination of the status information comprises sound pattern analysis of the second acoustic recording based on the comparison of the second acoustic recording to the first acoustic recording.

According to an example, the sound pattern analysis comprises utilization of a database 80 of sound data.

According to an example, the sensor data comprises a first plurality of sensor data for a time period between a time of acquisition of the first sensor data and a time of acquisition of the second sensor data. The output unit is configured to output the first plurality of sensor data based on the status information.

According to an example, the sensor data comprises a second plurality of sensor data for a time period after a time of acquisition of the second sensor data. The output unit is configured to output the second plurality of sensor data based on the status information.

The inventors realised that a simple system based on comparison of acquired data over relatively short timescales, based on in a detailed embodiment a combination of IR, visual, microphone technologies can be used for intrusion detection of a switchgear and detect if a fault has occurred.

The IR or visible camera, or two cameras operating over different wavelength ranges, can observe fast changes within the visual field of the camera. Beyond that, the IR-visual (temperature) image can be combined with acoustic and the optical-camera information to allow for a coherent assessment of the potentially severe situation inside of the panel by the customer or even trigger an automated shut-down. This enables the intrusion of animals or people in the panel to be detected, or as a safety measure in the time during/after a maintenance.

The inventors started from the current situation, where dynamic and very unlikely events are not detected inside of a switchgear but can lead to severe incidents. Traditionally, the temperature monitoring in a switchgear relates to point measurements at specific locations in direct contact with the heated busbars. As consequence, the temperature changes are very slow as the system is built from massive copper parts. However, such a system cannot detect other severe problems such as animal intrusion or lost parts can not be observed, due to several reasons. Thus, the traditional system cannot detect dynamic (fast) changes, and does not oversee the entire volume of a compartment/panels, sensor data are not combined for safety observation, and very rare events do not justify the cost of a specific monitoring installation.

However, the simple monitoring system described here addresses these issues.

A complete system utilizes un-masked IR-images and combines with other sensing elements, to observe dynamic changes in the time range of below seconds to minutes which are not related to "normal" (slow) heating or cooling down of the switchgear. Normally expected movements can be subtracted from images of drives and earthing switches in case they are part of an installation, and acoustic signals can similarly be subtracted.

Thus, a "normal" condition (background) and of the switchgear is acquired in terms of sensor data, and this is compared with the current image and/or acoustic signal at a fast pace in time. This simple comparison (e.g. subtracting) can be done on the local processor, or on a centralized computational unit, and the result can be withdrawn or deleted in the very likely case of no significant change. The background is then updated on a slow timescale with respect to the temperature monitoring, including the background noise and even the visual-image. An operator can then be informed once an unusual, dynamic change is detected, and can be provided with a series of IR-image to allow for an assessment of the situation, and an automated power-down can be triggered if necessary. An automated processing is feasible if enough data has been accumulated, including severe cases, such that advanced techniques can be trained for detection (for example running in the cloud).

The assessment is more robust and easier if combined with other sensors, such as for example a microphone or an optical-camera (non-IR) with an additional light source.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A low or medium voltage switchgear monitoring system, comprising:
    at least one sensor;
    a processing unit; and
    an output unit,
    wherein the at least one sensor comprises a microphone,
    wherein the at least one sensor is configured to acquire sensor data within a compartment of a switchgear,
    wherein the sensor data comprises first sensor data, and wherein the first sensor data comprises a first acoustic recording,
    wherein the sensor data comprises second sensor data, wherein the second sensor data comprises a second acoustic recording, the second sensor data being acquired a set time after the first sensor data,
    wherein the at least one sensor is configured to provide the first sensor data and the second sensor data to the processing unit,
    wherein the processing unit is configured to determine status information for the compartment of the switchgear, the determination comprising a comparison of the second sensor data to the first sensor data, and wherein the status information indicates that a change event in the compartment of the switchgear has occurred based on a determination that a change between the first sensor data and the second sensor data is greater than a threshold, and
    wherein the output unit is configured to output the status information.

2. The monitoring system according to claim 1, wherein the set time is 1 second, 2 seconds, 5 seconds, 10 seconds, 30 seconds, 1 minute, 2 minutes, or 5 minutes.

3. The monitoring system according to claim 1, wherein the comparison comprises a subtraction of the second sensor data from the first sensor data or a subtraction of the first sensor data from the second sensor data.

4. The monitoring system according to claim 1, wherein the at least one sensor comprises a camera, and
wherein the first sensor data comprises a first image and the second sensor data comprises a second image.

5. The monitoring system according to claim 4, wherein the camera comprises an infrared image acquisition camera and/or a visible image acquisition camera.

6. The monitoring system according to claim 4, wherein determination of the status information comprises a determination of a size of an object in the second image based on the comparison of the second image to the first image.

7. The monitoring system according to claim 4, wherein determination of the status information comprises a determination of a temperature of an object in the second image based on the comparison of the second image to the first image.

8. The monitoring system according to claim 4, wherein determination of the status information comprises image processing of the second image based on the comparison of the second image to the first image.

9. The monitoring system according to claim 8, wherein the image processing comprises utilization of a database of image data.

10. The monitoring system according to claim 9, wherein determination of the status information comprises sound pattern analysis of the second acoustic recording based on the comparison of the second acoustic recording to the first acoustic recording.

11. The monitoring system according to claim 10, wherein the sound pattern analysis comprises utilization of a database of sound data.

12. The monitoring system according to claim 1, wherein the sensor data comprises a first plurality of sensor data for a time period between a time of acquisition of the first sensor data and a time of acquisition of the second sensor data, and
wherein the output unit is configured to output the first plurality of sensor data based on the status information.

13. The monitoring system according to claim 12, wherein the sensor data comprises a second plurality of sensor data for a time period after a time of acquisition of the second sensor data, and
wherein the output unit is configured to output the second plurality of sensor data based on the status information.

14. A low or medium voltage switchgear, comprising:
the monitoring system according to claim 1.

* * * * *